United States Patent [19]

Stewart et al.

[11] 4,310,015
[45] Jan. 12, 1982

[54] CURB BOX WITH SNAP-ON BASE

[76] Inventors: Robert C. Stewart, 7031 Brafferton Pl., Worthington, Ohio 43085; Richard C. Stewart, 4483 Cassill Rd., Columbus, Ohio 43220

[21] Appl. No.: 128,633

[22] Filed: Mar. 10, 1980

[51] Int. Cl.³ .............................................. F16L 5/00
[52] U.S. Cl. ..................................... 137/364; 137/315
[58] Field of Search ............................... 137/363–373, 137/315

[56] References Cited

U.S. PATENT DOCUMENTS

| | | | |
|---|---|---|---|
| 407,955 | 7/1889 | Kallaher et al. | 137/369 |
| 996,956 | 7/1911 | Walcott | 137/370 |
| 1,578,885 | 3/1926 | Flinn | 137/366 |
| 3,548,864 | 12/1970 | Handley et al. | 137/364 |
| 3,601,143 | 8/1971 | Glennon | 137/364 |
| 3,901,271 | 8/1975 | Stewart | 137/364 |
| 4,030,519 | 6/1977 | Zinn | 137/371 |
| 4,239,056 | 12/1980 | Shope | 137/370 |

Primary Examiner—A. Michael Chambers
Attorney, Agent, or Firm—Beaman & Beaman

[57] ABSTRACT

The invention pertains to a synthetic plastic underground valve curb box assembly consisting of a vertically oriented casing adapted to enclose a buried valve wherein a base is associated with the curb box upon which the valve rests. The casing and base are locked together by "snap-on" connecting means wherein the casing may be pushed upon the base and automatically locks thereto by resiliently biased connectors, and the base permits a greater degree of valve support than previously attainable, the base being usable with both metal and plastic conduit valves.

4 Claims, 4 Drawing Figures

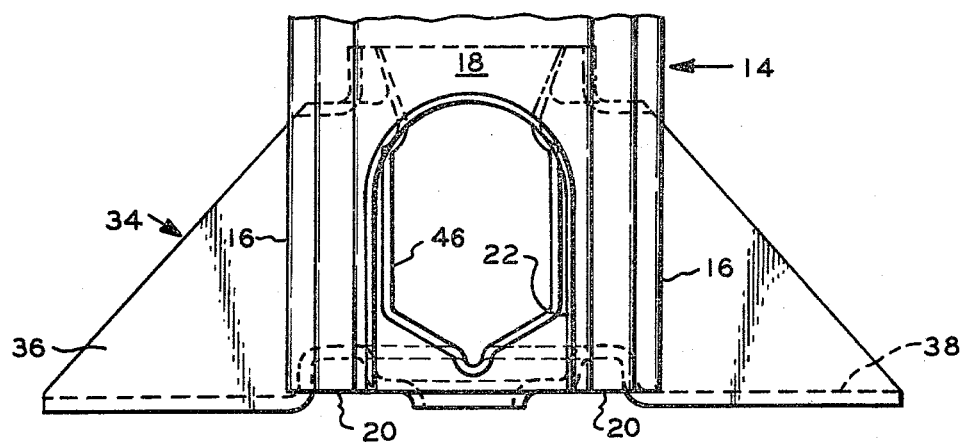
FIG. 2.
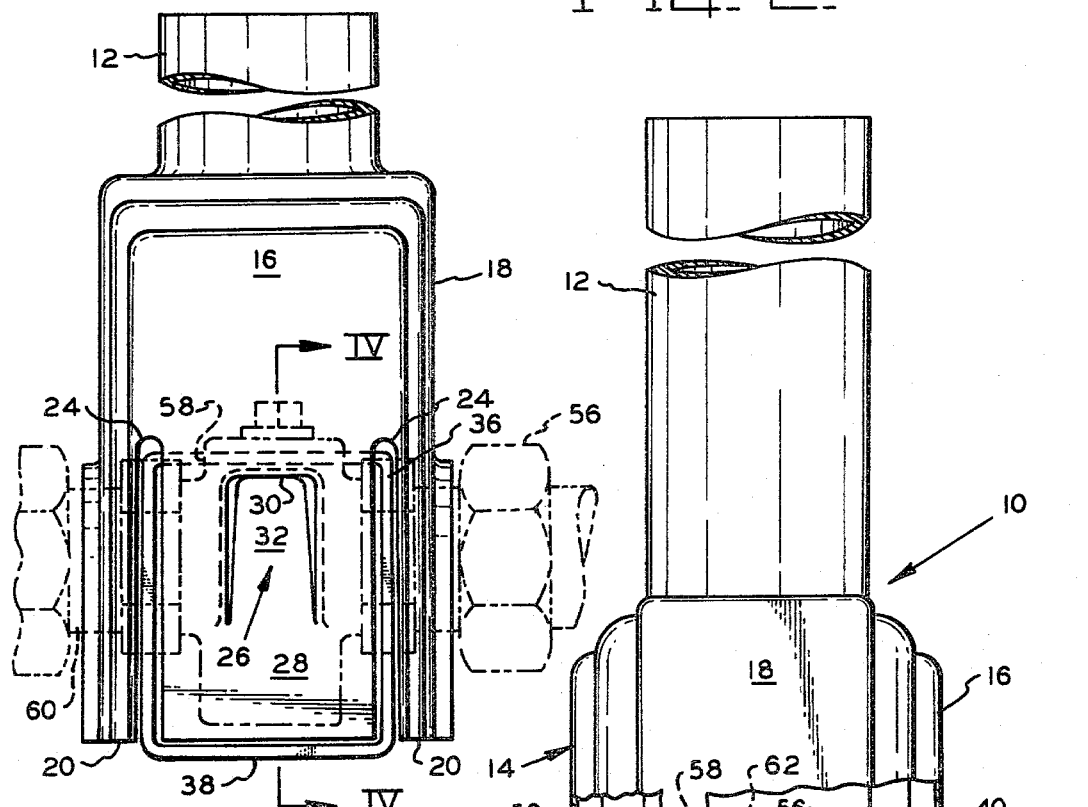
FIG. 3.
FIG. 4.

CURB BOX WITH SNAP-ON BASE

BACKGROUND OF THE INVENTION

Curb boxes constitute tubular casings usually having an enlarged lower ball housing for encompassing a buried utility service line valve, such as associated with a gas or water line. The upper end of the curb box includes a cover which is usually substantially flush with the ground surface, and removal of the cover permits an elongated wrench to be inserted into the curb box for valve actuation.

Early curb boxes were formed of cast iron, and in recent years synthetic plastic units have been widely used in view of the resistance provided against corrosion, and curb boxes are often constructed of two pieces, one telescoping within the other, wherein vertical forces applied to the curb box cover are not imposed upon the associated valve or conduit system. An example of a synthetic plastic curb box is shown in the assignee's U.S. Pat. No. 2,931,383.

The housing located at the lower end of the curb box is usually provided with an open end which is inserted over the service line valve. Curb box bell housing are often of non-circular configuration in order to resist torque forces imposed thereon, and it is known to incorporate horizontally disposed surfaces and shoulders to resist vertical movement such as caused by ground freezing. Additionally, it is known to utilize base structure mounted to the lower end of the curb box upon which the valve sits, as shown in the aforementioned patent, and curb box base devices may take a variety of forms as additionally illustrated in the assignee's U.S. Pat. Nos. 3,548,864 and 3,901,271. In prior curb boxes the housing is merely placed within the base, and while previous curb box bases do improve the support of the valve, and aid in supporting the curb box during backfilling, the assembly of the base and curb box housing is not of such strength that the base resists vertical curb box displacement.

Utility service lines are now widely utilizing coiled synthetic plastic conduit, and such conduit inherently resists laying flat in a trench due to torsion forces produced during manufacturing and coiling while hot. When applying a valve to such plastic conduit there is often a tendency for the valve to twist and misalign due to forces imposed thereon by the conduit and existing curb box constructions do not provide sufficient valve support to effectively resist such forces in order to maintain the proper orientation between the valve and curb box.

Metal valves installed upon synthetic plastic conduits have a tendency to "sag" due to the inability of the conduit to adequately support the weight of the valve, as is the case with metal pipe. Accordingly, with the increasing use of synthetic plastic conduit it is important that the curb box relieve the conduit of the weight of the valve in that relative vertical displacement of the valve and conduit may produce shear forces ultimately resulting in leakage.

It is an object of the invention to provide a valve curb box utilizing a base wherein the assembly of the base and curb box housing is easily accomplished, whereby the base is firmly affixed to the housing, is positive in action, and will not inadvertently release.

An additional object of the invention is to provide a curb box and base assembly wherein the curb box housing is firmly connected to the base merely by placing the housing upon the base and pushing downwardly wherein a "snap-on" connection is utilized.

An additional object of the invention is to provide a curb box and base assembly wherein a valve within the housing mounted upon the base is firmly supported against vertical and horizontal movement wherein the valve will not twist within the valve housing due to torsional forces imposed thereon by synthetic plastic conduit, and wherein the base accommodates itself to most valve configurations now being employed with utility service lines.

Another object of the invention is to provide a curb box and base assembly which may be used with both metal and synthetic plastic valves.

An additional object of the invention is to provide a curb box and base assembly employing a snap-on interconnection therebetween wherein relative rotation between the curb box housing and base is resisted, and forces imposed upon the curb box structure by the surrounding earth resists curb box and base rotation, and augment the interconnection of the housing and base components.

In the practice of the invention, a curb box casing having a lower valve bell housing of rectangular horizontal cross section is provided with slots intersecting the housing bottom edge whereby the housing may be placed upon an elongated base member having vertical walls. The interrelationship of the housing side and end surfaces with the base, and the cooperation between the slots and the base, prevent relative rotation of the casing and base about the casing vertical axis. The sidewalls of the housing intermediate slots defined thereon are provided with abutment surfaces or "hooks" adjacent oblique cam surfaces whereby insertion of the housing upon the base causes edges on the base to deflect the housing sides outwardly until the abutment surfaces snap under surfaces on the base thereby producing a positive locking of the casing with the base.

The housing end surfaces are provided with openings intersecting the housing bottom permitting the conduit to enter the housing, and the base is also formed with conduit receiving openings which align with those of the curb box housing. The base is of such configuration to firmly support the valve within the housing, and vertically disposed walls defined upon the base engage the earth to resist torque forces imposed upon the housing by the stresses built into the conduit during manufacture and by the turning of the valve itself.

BRIEF DESCRIPTION OF THE DRAWINGS

The aforementioned objects and advantages of the invention will be appreciated from the following description and accompanying drawings wherein:

FIG. 2 is a detail end elevational view of an assembled curb box and housing, FIG. 3 is a side, elevational view of the assembled curb box and base, and FIG. 4 is a side view, partially in section, as taken along Section IV—IV of FIG. 3, illustrating the curb box and base in assembled relation.

DESCRIPTION OF THE PREFERRED EMBODIMENT

Figure 1:
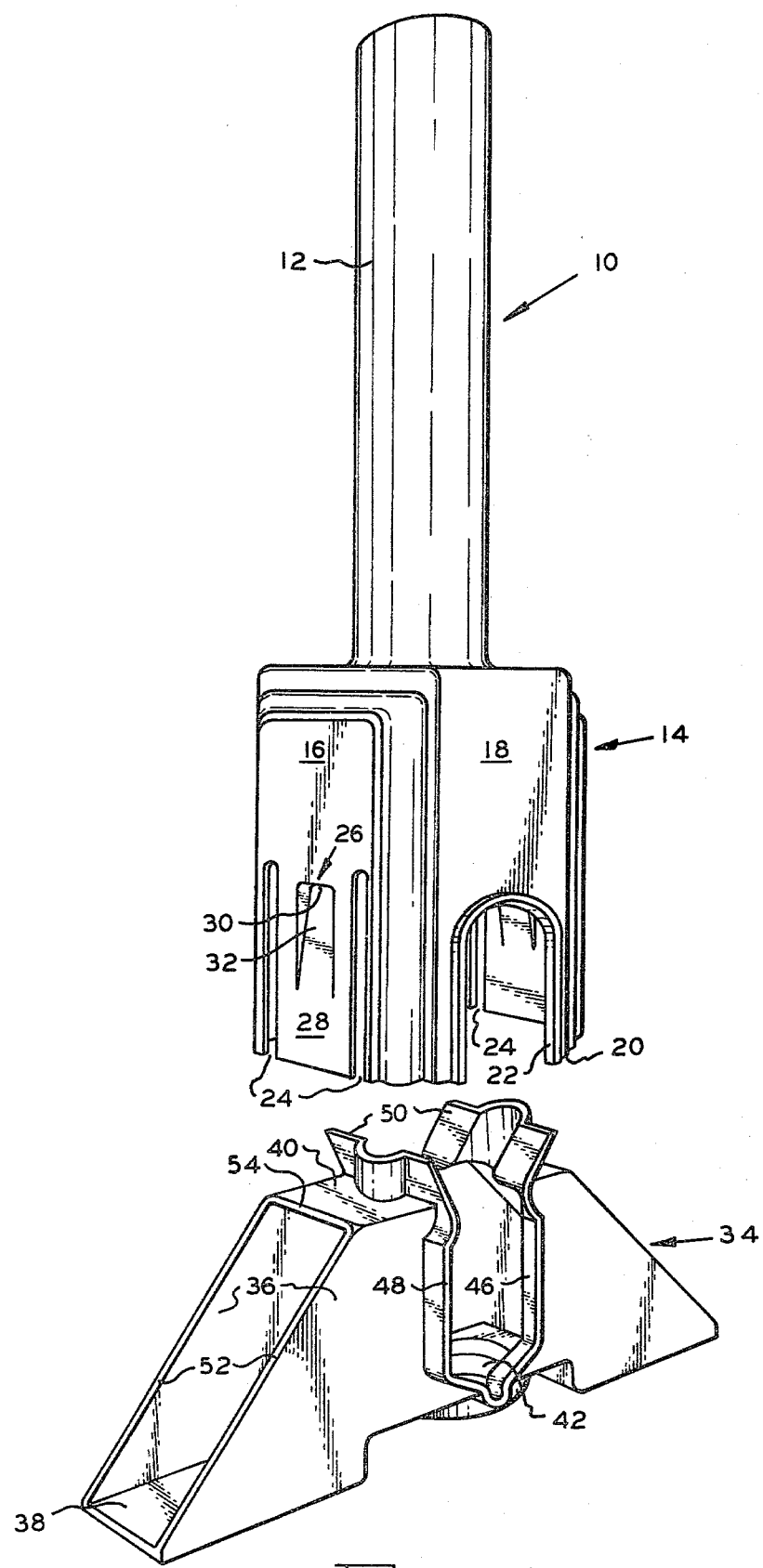
FIG. 1 is an elevational, perspective view of a curb box lower casing, and base, prior to insertion of the curb box housing upon the base.

In FIG. 1 a lower curb box casing 10 is illustrated, the casing consisting of a tubular column 12 having an enlarged bell or valve housing 14 defined upon the lower end thereof. The casing is formed of a synthetic plastic material, such as ABS (acrylonitrile butadiene styrene). The casing 10 is used in conjunction with an upper curb box component, not shown, telescopically associated with the column 12, and this relationship will be appreciated from the aforementioned patents assigned to the assignee. As the upper curb box structure forms no part of the instant invention its illustration and description is omitted.

The housing 14 consists of lateral side walls 16 and end walls 18. The sides 16 are provided with embossments to add rigidity to the housing, and the side and end walls terminate in a lower edge 20 wherein the housing is open at its lower end. Archway type openings 22 are defined in the end walls 18 intersecting the lower edge 20, and the openings are of sufficient dimension to receive the service line valve or conduit with which the curb box will be used.

The sidewalls 16 are each provided with a pair of vertically oriented elongated slots 24 which intersect the lower edge 20 and extend approximately halfway up the housing vertical dimension. Intermediate the slots 24 locking structure 26 is homogenously defined upon the cantilevered sidewall portions 28 defined by the slots. The locking structure 26 includes a abutment surface or hook 30 horizontally disposed inwardly, FIG. 4, which intersects an oblique cam surface 32 which, at its lower region, merges with the planar configuration of the associated portion 28. The resilient nature of the synthetic plastic material of the housing 14 permits the portions 28 of the sidewalls to deflect outwardly for a purpose later described.

The base 34 is also formed of a synthetic plastic material such as ABS, and is of an elongated configuration defined by spaced parallel vertical sidewalls 36, a bottom panel 38, and a top panel 40, forming a generally box like configuration. The central region of the bottom panel 38 is formed with a plurality of concentric recesses 42 terminating in a circular opening 44, and the sidewalls 36 include U-shaped openings 46 defined by an outwardly extending rim 48. The openings 46 intersect the top panel 40 which is centrally open as defined by upwardly extending flanges 50.

The edges of sidewalls 36 are obliquely defined at 52, and the top panel 40 terminates at an edge 54 extending between the base walls 36. The horizontal spacing between the top panel edges 54 is slightly less than the normal spaced between the housing sidewalls 16 as the edges 54, and the top panel 40 constitute an abutment surface for cooperating with the locking structure 26 of the curb box housing.

In use, a service line, not shown, will be lying within a trench. The service line will include a valve 56, shown in dotted lines in FIGS. 3 and 4, and this valve will include a central vertical portion 58 and horizontal portions 60. The valve central portion includes an upwardly extending valve operator 62, which is engaged by the wrench inserted through the curb box column 12. The valve horizontal portions 60 will be closely received within the base openings 46, and as the base bottom panel 38 will be engaging the earth and the valve will rest on recesses 42, the base 34 constitutes a valve support.

After locating the service line valve within the base the casing 10 is inserted on the base 34. This assembly is accomplished by aligning the openings 22 above the base openings 46, and aligning the slots 24 with the base side walls 36. The housing 14 may now be easily inserted upon the base, and as the housing is moved downwardly the base edges 54 will engage the oblique cam surfaces 32 deflecting the sidewall portions 28 outwardly. As the downward movement of the housing continues the portions 28 will be increasingly deformed outwardly until the abutment portions 30 pass over the base top panel and the portions 28 will then "snap" back to the normal configuration as shown in FIG. 4. In this relationship the abutment surfaces 30 are located adjacent the underside of the base top panel 40, and the housing and base are now firmly interconnected.

The height of the housing openings 22 is such that upon locking of the housing 14 upon the base 34 occurring the upper arch of the openings will be disposed just above the valve portions or conduit portions extending from the openings 22, and as will be appreciated from FIG. 4, the valve 56 is now snugly received and located within the base and housing. The assembly is now complete, and the trench may be backfilled.

During trench backfilling the earth will enter the base 34 between the sidewalls 36, and of course, engage the outer surfaces of these walls. Likewise, the side and end walls of the housing 14, and the column, will be buried. The inward force imposed upon side wall portions 28 insures that the abutment surfaces 30 will be firmly maintained underneath the top panel edges 54, and vertical forces upon the casing 10 will not permit the casing and housing to be released from the base 34.

The length of the base 34 is sufficient to provide excellent lateral support of the assembly during backfilling, and while it is the usual practice for the curb box to be manually supported during the initial stages of backfilling, the base reduces the need for such support as compared with most curb box constructions.

In that the valve 56 is supported by both the base 34, and housing 14, the valve will not sag relative to the associated conduits, even if such conduits are of synthetic plastic material, and the apparatus of the invention may be used with either metal or synthetic plastic service line valves. Likewise, the superior valve support provided by the invention resists twisting of the valve due to torsional forces imposed thereon by a previously coiled synthetic plastic service line, and the likelihood of the valve being misaligned to the extent to render wrench operation difficult is eliminated. The engagement of both surfaces of the sidewalls 36 with the surrounding earth, as well as the rectangular configuration of the housing 14, provides excellent resistance to curb box rotation about its vertical axis, and the disclosed construction provides excellent stability both during assembly, backfilling and after installation is complete.

It is appreciated that various modifications to the inventive concepts may be apparent to those skilled in the art without departing from the spirit and scope of the invention.

We claim:

1. An underground curb box comprising, in combination, an elongated casing having an upper tubular portion and a lower valve housing member, said housing member including end walls, lateral side walls and an open bottom defined by a bottom edge, conduit receiving openings defined in said end walls intersecting said bottom edge, a base member having a bottom portion and vertically extending wall portions, said wall portions having at least a partial plan configuration corresponding to at least a partial plan configuration of said lower valve housing member wherein said base member interfits with said valve housing member to close said housing member open bottom, resiliently biased locking means defined upon one of said members, abutment locking means defined on the other of said members, said locking means defined on said members automatically engaging upon said housing member and base member being assembled by lowering said housing member upon said base member to retain said base member upon said housing member.

2. In an underground curb box as in claim 1, said base member having an elongated configuration extending substantially parallel to said housing member end walls, said base member wall portions being exposed to the earth surrounding said curb box when in use whereby said base member wall portions resist rotation of said base member about the axis of said casing.

3. In an underground curb box as in claim 2, said base member including U-shaped conduit receiving openings adapted to align with said housing member openings, said openings being defined by vertically extending edges adapted to engage conduit extending through said curb box upon rotation of said casing about its axis.

4. An underground curb box comprising, in combination, an elongated casing having an upper tubular portion and a lower valve housing, said housing including end walls, lateral side walls and an open bottom defined by a bottom edge, conduit receiving openings defined in said end walls intersecting said bottom edge, a base having a bottom portion and vertically extending wall portions, said wall portions having at least a partial plan configuration corresponding to at least a partial plan configuration of said lower valve housing wherein said base interfits with said valve housing to close said housing open bottom, mutually engagable snap-on resilient locking means defined on said housing and base automatically engaging and locking upon said housing and base being fully assembled to retain said base upon said housing, said locking means including a deformable cantilevered spring portion homogeneously defined on each of said housing side walls, a shoulder defined upon each spring portion transversely disposed to the length of said casing and a cam surface defined on each spring portion below and intersecting a shoulder, and abutment surfaces defined upon said base engaging said cam surfaces upon lowering said housing upon said base deflecting said spring portions from their normal position, said spring portions returning to their normal position and said shoulder underlying said abutment upon said housing being fully inserted upon said base.

* * * * *